United States Patent
Aneziris et al.

(10) Patent No.: US 8,450,229 B2
(45) Date of Patent: May 28, 2013

(54) MIX AND REFRACTORY PRODUCT HAVING A HIGH HYDRATION RESISTANCE PRODUCED THEREFROM

(75) Inventors: Christos G. Aneziris, Freiberg (DE); Uwe Klippel, Freiberg (DE); Christoph Tontrup, Alzenau (DE)

(73) Assignees: Evonik Degussa GmbH, Essen (DE); Technische Universität Bergakademie Freiberg—Institut für Keremik, Glas-und Baustofftechnik, Freiberg (DE)

( * ) Notice: Subject to any disclaimer, the term of this patent is extended or adjusted under 35 U.S.C. 154(b) by 0 days.

(21) Appl. No.: 12/747,384

(22) PCT Filed: Dec. 10, 2008

(86) PCT No.: PCT/EP2008/067162
§ 371 (c)(1),
(2), (4) Date: Jun. 10, 2010

(87) PCT Pub. No.: WO2009/077395
PCT Pub. Date: Jun. 25, 2009

(65) Prior Publication Data
US 2010/0273636 A1    Oct. 28, 2010

(30) Foreign Application Priority Data
Dec. 17, 2007    (EP) .................................... 07123325

(51) Int. Cl.
C04B 35/03    (2006.01)
C04B 35/04    (2006.01)
C04B 35/00    (2006.01)

(52) U.S. Cl.
USPC .............................. 501/109; 501/108; 501/122

(58) Field of Classification Search
USPC .......................... 501/100, 101, 108, 109, 122
See application file for complete search history.

(56) References Cited

U.S. PATENT DOCUMENTS

| | | | | |
|---|---|---|---|---|
| 4,989,664 A | * | 2/1991 | Roth | 164/361 |
| 5,007,615 A | | 4/1991 | Kernion et al. | |
| 5,250,479 A | * | 10/1993 | Rancoule et al. | 501/101 |
| 5,681,499 A | * | 10/1997 | Benson et al. | 222/606 |
| 2008/0280152 A1 | | 11/2008 | Aneziris et al. | |

FOREIGN PATENT DOCUMENTS

| | | |
|---|---|---|
| DE | 10 2006 021 225 | 11/2007 |
| GB | 1 437 062 | 5/1976 |
| JP | 2004-10379 A | 1/2004 |
| WO | 2007 048406 | 5/2007 |

OTHER PUBLICATIONS

Japanese Office Action Issued May 30, 2012 in Patent Application No. 2010-538573 (partial English translation only).

* cited by examiner

Primary Examiner — Kaj K Olsen
Assistant Examiner — Noah Wiese
(74) Attorney, Agent, or Firm — Oblon, Spivak, McClelland, Maier & Neustadt, L.L.P.

(57) ABSTRACT

Mix which comprises a) one or more very finely divided silicon dioxide powders having an average particle diameter of from 2 to 100 nm and a BET surface area of at least 30 m²/g, b) one or more particulate components selected from the group consisting of oxides, carbides and nitrides, in each case having an average particle diameter of from >0.5 μm to 30 mm, c) one or more synthetic resins as binders and d) one or more metallic antioxidants having an average particle diameter of from >0.5 to 250 μm. Process for producing a shaped body, in which to the mix is introduced into a mould, pressed if appropriate and heated to a temperature at which the synthetic resin crosslinks thermally. Shaped body which can be obtained therefrom. Process for producing a refractory shaped body, in which the shaped body is carbonized. Refractory shaped body which can be obtained therefrom.

9 Claims, No Drawings

MIX AND REFRACTORY PRODUCT HAVING A HIGH HYDRATION RESISTANCE PRODUCED THEREFROM

The invention relates to a mix, a process for producing a shaped body by means of this mix, and also the shaped body itself.

Carbon-bonded, refractory products are used widely as lining in metallurgical vessels, for example as carbon-bonded magnesia bricks in a converter, or as key components, for example immersed discharge outlets or slider plates or stoppers or pouring channels in continuous casting.

Carbon-bonded, refractory products are also used in the blast furnace sector, in transport vessels, e.g. ladles, or in the chemical industry or in the waste incineration industry as heat-resistant pipes or in the cement industry as lining material.

Ceramic, carbon-bonded membranes or ceramic, carbon-bonded heat shields are further examples of such components.

Additions of antioxidants, for example metal powders, boridic powders or nitridic powders, make it possible to improve the oxidation and thermal shock properties of refractory products. This is explained by the reaction of the antioxidants with a binder, carbon black or graphite to form fibrous metal carbides.

However, the prior art does not disclose how the hydration resistance of finished, carbon-containing refractory products can be improved using metallic antioxidants. These antioxidants react with carbon to form metal carbides during the carbonization process. These carbides can absorb moisture during storage, which can result in a volume expansion and destruction of the refractory product.

It was an object of the invention to provide a carbon-bonded refractory product which minimizes or completely avoids these disadvantages.

Furthermore, it was an object of the invention to prepare a mix with which this refractory product can be produced.

The invention provides a mix comprising
a) one or more very finely divided silicon dioxide powders having an average particle diameter of from 2 to 100 nm, preferably from 7 to 60 nm, and a BET surface area of at least 30 m$^2$/g, preferably a BET surface area of from 30 to 100 m$^2$/g, particularly preferably one of from 30 to 500 and most particularly preferably one of 40 to 400 m$^2$/g,
b) one or more particulate components selected from the group consisting of oxides, carbides and nitrides, in each case having an average particle diameter of from >0.5 μm to 30 mm,
c) one or more synthetic resins as binders and
d) one or more metallic antioxidants having an average particle diameter of from >0.5 to 250 μm.

In one particular embodiment of the invention, the mix consists of the components of features a) to d).

The very finely divided silicon dioxide powder present in the mix of the invention can be present in the form of aggregates and/or isolated individual particles. An individual particle of an aggregate is referred to as a primary particle. The average particle diameter is based on an individual, isolated particle or on a primary particle within an aggregate. The origin of the silicon dioxide powder is not critical. Thus, silicon dioxide powders obtained by sol-gel processes, precipitation processes or flame processes can be present in the mix of the invention. It has been found to be advantageous for powders produced by flame processes, known as pyrogenic silicon dioxide powders, to be present in the mix. The primary particles of the pyrogenic silicon dioxide powders have a particular absence of pores and a high purity.

Suitable pyrogenic silicon dioxide powders are AEROSIL® OX50, AEROSIL® 90, AEROSIL® 130, AEROSIL® 150, AEROSIL® 200 and AEROSIL® 300, all Evonik Degussa. In addition modified silicon dioxide powders having a reduced structure, like AEROSIL® 200 SP and AEROSI® 300 SP or similar types with a BET surface are between 90 an 200 m$^2$/g, can be used.

It is also possible for the silicon dioxide powder to be a mixture of powders which have different origins, different BET surface areas and/or different particle sizes.

The very finely divided silicon dioxide powder can also be present in surface-modified form. Thus, the surface can have been modified, for example, by means of halo-organosilanes, alkoxysilanes, silazanes, siloxanes or polysiloxanes. The silanizing agent can preferably be trimethoxyoctylsilane [$(CH_3O)_3$—Si—$C_8H_{17}$], octamethylcyclotetrasiloxane or hexamethyldisilazane.

The very finely divided silicon dioxide is preferably used as a powder. However, it is also possible to use organic dispersions. Here, organic encompasses, for example, alcohols and diols. The silicon dioxide content of the dispersions should be very high. It should preferably be at least 15% by weight, based on the dispersion. The dispersion should ideally be stable in respect of gelation and sedimentation over a prolonged period of time. This can be achieved, for example, by addition of additives.

The proportion of the very finely divided silicon dioxide powder in the mix of the invention depends, inter alia, on the type of particulate component, the carbon-containing binder and the antioxidant and their proportions. In general, the proportion of the very finely divided silicon dioxide powder is from 0.01 to 5 percent by mass, preferably from 0.1 to 1 percent by mass, in each case based on the particulate component of the mix.

A particulate oxidic component of the mix can preferably be selected from the group consisting of magnesium oxide, calcium oxide, dolomite, aluminium oxide, yttrium oxide, zirconium dioxide, zirconium mullite, magnesium-aluminium spinel, bauxite, physical mixtures of the abovementioned materials and chemical mixtures of the abovementioned materials. A particularly preferred particulate, oxidic component is magnesium oxide.

The particulate component can also be selected from the group consisting of silicon carbide, silicon nitride, boron nitride and mixtures of the abovementioned materials.

A further important constituent of the mix is a synthetic resin. This can preferably be a phenolic resin, a novolak, or a resol.

Moreover, the mix according to the invention can comprise carbon in the form of graphite or carbon black, synthetic pitch, pitch, bitumen and mixtures thereof.

The proportion of the synthetic resin, if appropriate including carbon, synthetic pitch, pitch and bitumen is preferably from 0.5 to 20 percent by mass, based on the particulate component of the mix. Particular preference is given to a proportion of from 1 to 5 percent by mass, based on the particulate component of the mix.

Furthermore, the mix of the invention contains one or more metallic antioxidants. These are preferably powders selected from the group consisting of aluminium, iron, magnesium, silicon and titanium. The proportion of antioxidant in the mix of the invention can preferably be from 0.5 to 5 percent by mass, based on the particulate component of the mix.

In addition, the mix of the invention can additionally contain at least one further constituent selected from the group consisting of titanium dioxide, ilmenite, $FeTiO_3$, $CaTiO_3$, $MgTiO_3$ and $BaTiO_3$. The total proportion of these constituents is preferably from 0.01 to 5 percent by mass, particularly preferably from 0.1 to 1 percent by mass, in each case based on the particulate component of the mix. The particle diameter of these constituents is preferably from 2 nm to 5 μm.

Particular preference is given to a mix which comprises from 0.1 to 2 percent by mass of a pyrogenic silicon dioxide powder having an average particle diameter of from 7 to 50 nm and a BET surface area of from 40 to 400 $m^2/g$ as very finely divided component and magnesium oxide having an average particle diameter of from 1 μm to 10 mm as particulate component, from 1 to 5 percent by mass of a phenolic resin, a novolak or a resol as synthetic resin and an aluminium powder having an average particle diameter of from 1 to 100 μm as antioxidant, with the percentages being based in each case on the particulate component of the mix.

The invention further provides a process for producing a refractory shaped body, in which at least one hardener is, if appropriate, added to the mix of the invention, the mix is introduced into a mould, pressed if appropriate and heated to a temperature at which the synthetic resin crosslinks thermally.

Preference is given to using phenolic resin which is subsequently cured by means of a hardener as carbon-containing binder. Novolaks in the presence of formaldehyde or compounds which release formaldehyde, for example hexamethylenetetramine, can also be well-suited.

The invention further provides a refractory shaped body which can be obtained by the process of the invention.

The shaped body obtained in this way is characterized in that it is to a great extent hydration-resistant during use. It is known that carbide phases are formed in the carbonization of shaped bodies containing metallic antioxidants. In applications in which the shaped bodies cool to a substantial extent after in-situ carbonization and can thus absorb water, for example in the event of an interruption to production, decomposition of the carbides formed during carbonization with a reduction in volume and therefore destruction of the shaped body as has hitherto been known in the prior art does not occur. The role of the very finely divided silicon dioxide has not yet been elucidated.

The invention further provides a process for producing a refractory shaped body, in which the shaped body of the invention is carbonized at a temperature of from 750 to 1500° C.

The invention further provides a refractory shaped body which can be obtained by the process of the invention. For the purposes of the present invention, refractory means that the softening point is above 1500° C.

The shaped body which can be obtained in this way is characterized in that it has a high hydration resistance. This means that even after storage for a number of weeks during which it could absorb moisture, it is not destroyed as a result of the volume increase due to decomposition of the carbide phases which have been formed by reaction of the metallic antioxidants with the synthetic resin during carbonization. This makes it possible to dispense with elaborate packaging of the refractory shaped body, for example slider plates, immersed discharge outlets, stoppers, flushing cones, shadow tubes, outlet nozzles.

The invention further provides for the use of the shaped bodies of the invention for producing slider plates, immersed discharge outlets, stoppers, flushing cones, shadow tubes, outlet nozzles, membranes, thermal insulation materials, heat shields and graphite electrodes and as refractory bricks.

EXAMPLES

MgO—C Converter Bricks

Commercially available, high-purity fused magnesia having a particle bulk density of 3.52 $g/cm^3$ and a purity of 97 percent by mass (Possehl, Germany) in four particle size fractions which are designed for an optimal packing density is used as particulate component.

Natural graphite (graphite from Kropfmühl, Germany) is used as carbon. The graphite contains 94 percent by mass of carbon and has a specific surface area of 1 $m^2/g$ and a $d_{50}$ value of 0.2 mm.

Novolak resin (Hexion Specialty Chemicals, Germany) together with Carbores®P (Rütgers, Germany) derived from coal tar pitch serve as carbon-containing binders. Hexamethylenetetramine is used as hardener for the novolak resin.

Coarse aluminium powder (TLS Technik, Germany) having a d90 of <75 μm is used as antioxidant.

The product AEROSIL® OX50, Evonik Degussa GmbH, is used as very finely divided metal oxide.

Furthermore, AERODISP® G 1220, Evonik Degussa GmbH, a dispersion based on ethylene glycol containing a proportion of silicon dioxide of 20% by weight, is also used.

As comparison, use is made of relatively coarse microsilica—RW Füller.

Table 1 shows the base mix, with the binder contents being based on the totality of magnesia particles and graphite.

Table 2 gives an overview of the mixes examined.

Homogenization was carried out in an Eirich laboratory mixer.

Shaping is carried out by means of a uniaxial press provided with a floating die. The maximum pressing pressure of 150 MPa is coupled with two precompaction and release phases at about 80 MPa. Carbonization takes place at 1000° C. in a reducing atmosphere (bed of carbon). The heating rate is 1.5 K/min and the hold time is 300 min.

After carbonization, all mixes display similar mechanical and thermal properties, viz. a cold compressive strength of about 40 MPa, 45 MPa for D, and a hot flexural strength at 1400° C. of about 10 MPa.

After about 24 hours, the "Ref." sample displays spalling and formation of macrocracks due to a volume increase in the percent range.

After about 48 hours, the same phenomena occur for samples B and C, while the mixes A and D according to the invention display no significant volume increase or crack formation even after a period of six months.

TABLE 1

| Base mix | |
|---|---|
| | Percent by mass |
| MgO [2-4 mm] | 20.5 |
| MgO [1-2 mm] | 32.5 |
| MgO [0-1 mm] | 22.0 |
| MgO [<63 μm] | 13.0 |
| Graphite (NFL) | 12.0 |
| | 100.0 |
| Novolak 9950FL | 2.2 |
| Hardener | 0.2 |
| Carbores ® P | 1.0 |
| Al | 2.2 |

TABLE 2

| Mixes | Percent by mass | Ref.[$] | A[&] | B[$] | C[$] | D[&] |
|---|---|---|---|---|---|---|
| AEROSIL ® OX50 | 0.4 | — | X | — | — | — |
| RW Füller | 0.4 | — | — | X | — | — |
| RW Füller | 2.0 | — | — | — | X | — |
| AERODISP ® G 1220 | 0.4[#] | — | — | — | — | X |
| Aluminium | 2.2 | X | X | X | X | — |

[$]comparison;
[&]according to the invention;
[#]based on solid X

The invention claimed is:

1. A mix, comprising
   a) at least one very finely divided, aggregated, pyrogenic silicon dioxide powder having an average particle diameter of from 2 to 100 nm and a BET surface area of at least 30 m$^2$/g, wherein the very finely divided, aggregated, pyrogenic silicon dioxide powder is in the form of an organic dispersion having a silicon dioxide content of at least 15 wt %,
   b) magnesium oxide having an average particle diameter of from >0.5 μm to 30 mm,
   c) at least one synthetic resin as binder, and
   d) at least one metallic antioxidant having an average particle diameter of from >0.5 to 250 μm;
   wherein the at least one very finely divided, aggregated, pyrogenic silicon dioxide powder is present in the mix in an amount of from 0.01 to 5 percent by mass, based on the magnesium oxide.

2. The mix according to claim 1, further comprising at least one binder selected from the group consisting of synthetic pitch, pitch, bitumen and carbon.

3. The mix according to claim 1, wherein the proportion of the at least one synthetic resin is from 0.5 to 20 per cent by mass, based on the magnesium content.

4. The mix according to claim 1, wherein the at least one metallic antioxidant is at least one powder selected from the group consisting of aluminum, iron, magnesium, silicon, and titanium.

5. The mix according to claim 1, wherein the proportion of the at least one metallic antioxidant is from 0.5 to 5 per cent by mass, based on magnesium oxide.

6. A process for producing a shaped body, comprising:
   optionally, adding at least one hardener to the mix according to claim 1;
   introducing the mix into a mold;
   optionally, pressing; and
   heating to a temperature at which the at least one synthetic resin crosslinks thermally.

7. The process according to claim 6, wherein the shaped body is at least one slider plate, immersed discharge outlet, stopper, flushing cone, shadow tube, outlet nozzle, membrane, thermal insulation material, heat shield, graphite electrode, or refractory brick.

8. The mix according to claim 1, wherein the organic dispersion comprises at least one selected from the group consisting of an alcohol and a diol.

9. The mix according to claim 1, wherein the organic dispersion comprises ethylene glycol.

* * * * *

UNITED STATES PATENT AND TRADEMARK OFFICE
CERTIFICATE OF CORRECTION

PATENT NO.           : 8,450,229 B2
APPLICATION NO.      : 12/747384
DATED                : May 28, 2013
INVENTOR(S)          : Christos G. Aneziris et al.

Page 1 of 1

It is certified that error appears in the above-identified patent and that said Letters Patent is hereby corrected as shown below:

On the title page, Item (73), the Assignees' information is incorrect. Item (73) should read:

--(73)   Assignees:   Evonik Degussa GmbH, Essen (DE);
Technische Universität Bergakademie Freiberg – Institut für Keramik, Glas – und Baustofftechnik, Freiberg, (DE)--

Signed and Sealed this
Twenty-third Day of July, 2013

Teresa Stanek Rea
*Acting Director of the United States Patent and Trademark Office*